United States Patent
// Greenwald

[15] 3,698,727
[45] Oct. 17, 1972

[54] DISTORTABLE SEAL RING
[72] Inventor: Fred A. Greenwald, South Gate, Calif.
[73] Assignee: General Connectors Corporation, Burbank, Calif.
[22] Filed: May 17, 1971
[21] Appl. No.: 144,123

Related U.S. Application Data

[63] Continuation-in-part of Ser. No. 789,669, Jan. 8, 1969, abandoned.

[52] U.S. Cl. ................277/153, 277/228, 285/110
[51] Int. Cl. ..............................................F16j 15/32
[58] Field of Search......277/206, 228, 229, 230, 152, 277/153; 285/110, 111

[56] References Cited

UNITED STATES PATENTS 2,488,465  11/1949  Bourne, Jr. ................277/152
3,206,229  9/1965   Kramer ......................285/114

*Primary Examiner*—William E. Wayner
*Attorney*—Lyon & Lyon

[57] ABSTRACT

A seal ring of essentially U-shaped or J-shaped cross section is intended to be interposed between a coupling having a radially inwardly directed wall and a conduit tube loosely received therein; wherein, the axially outer radial wall of the seal ring formed of elastomer impregnated laminations of fiber glass or similar material capable of axial distortion bears against the coupling end wall and is joined to a radially and axially inwardly curved conduit engaging a semitoroidal portion capable of axial as well as radial distortion, the interior of the seal ring including the inner surface of the outer radial wall, being exposed to pressure within the coupling and conduit. Certain embodiments of the seal ring include a core of elastomeric material or a toroidal compression spring or both, and one embodiment having a radially outer cap band separated by a slit from the axially inner side of the seal ring.

14 Claims, 11 Drawing Figures

PATENTED OCT 17 1972　　3,698,727

INVENTOR.
FRED A. GREENWALD
BY Lyon & Lyon
ATTORNEYS

DISTORTABLE SEAL RING

This application is a Continuation-In-Part of Ser. No. 789,669, filed Jan. 8, 1969, entitled "Distortable Seal Ring," now abandoned.

BACKGROUND AND SUMMARY OF THE INVENTION

The present invention is related to but not limited to the type of seal and coupling exemplified in U.S. Pat. No. 3,206,229, and is more specifically related to the type of seal ring shown in the copending application, Ser. No. 741,602, filed July 1, 1968. The construction disclosed in the copending application has proven to be successful particularly as a seal for high temperature aircraft ducts or conduits; however, tests have indicated that, if the seal is modified as herein presented, the service life can be further extended, even doubled.

Therefore, included in the objects of this invention are:

First, to provide a seal ring having a radially extending axially outer wall formed of high strength yet flexible fabric laminating impregnated with an elastomer, the impregnated laminations continuing to form a semitoroidal sealing lip, the axially inner side of the wall and the semitoroidal lip being exposed to pressure and the juncture region therebetween being capable of limited distortion to improve the seal.

Second, to provide a seal of this type wherein the elastomer impregnated fabric wall may be U-shaped or J-shaped in cross section and with or without a radially outer cap band joined along one margin and forming an annular slot around its other margin so as to fit within a channel of standard dimensions in place of a conventional seal ring such as the type shown in the previously noted U.S. Pat., No. 3,206,229.

Third, to provide a seal ring of the type indicated in the preceding object which may contain an elastomer core bonded to the fabric walls or freely received therein.

Fourth, to provide a seal ring which may be J-shaped in cross section, formed of an elastomer impregnated fabric wherein the end wall of greater radial depth is intended to be received in a retainer channel, the remaining portion of the seal forming an annular sealing lip intended to be urged into sealing engagement with a conduit or duct received therein.

Fifth, to provide a seal ring utilizing high strength, flexible elastomer impregnated fabric laminations of U-shaped or J-shaped cross section and with or without an elastomer core in which is mounted a garter spring to provide a constricting force.

Sixth, to provide a seal ring which is capable of extremely long service life and has high dependability even under adverse conditions, thereby providing a seal ring expecially suited for aircraft use.

Figure 1:
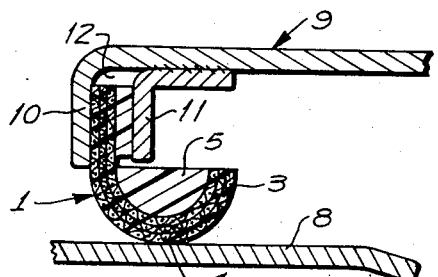
FIG. 1 is an enlarged sectional view, showing one form of the distortable seal ring in its initial condition, and showing fragmentarily a coupling in which the seal ring is mounted, as well as a tubular duct or conduit, also shown fragmentarily.
Figure 2:
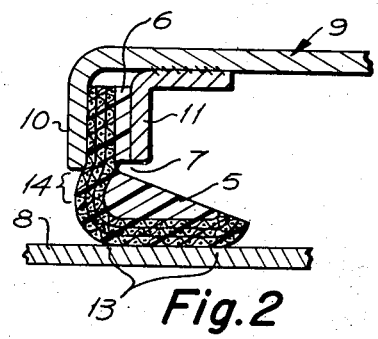
FIG. 2 is a similar sectional view, showing the manner in which the seal ring deforms to improve the seal.

Reference is first directed to FIGS. 1 and 2. In the construction here illustrated, the seal ring 1 is formed by one or more fabric laminations 1a, depending upon the size and the nature of use of the seal ring. The fabric employed may be formed of glass fibers or asbestos, particularly if the seal ring is to be exposed to high temperatures. However, other fibers, including metal, may be employed in the fabric, depending upon the nature of use. The fabric laminations are impregnated with an elastomer, for example, silicone based elastomers, if high temperatures are involved or if extremely low temperatures are involved. It should be noted that the thickness as well as the number of laminations may vary to suit the conditions of use.

In the construction shown in FIGS. 1 and 2, the seal ring is essentially J-shaped in cross section and includes an axially outer planar wall 2, which continues radially inward and curves to form a semitoroidal wall 3, the radially inner portion of which forms an annular sealing surface 4. The semitoroidal wall 3 receives a semitoroidal elastomer core 5, which may be formed of the same elastomer which impregnates the fabric laminations 1a.

The planar wall 2 may have a lamination 6, formed of an elastomer, bonded to the fabric laminations. A groove 7 is preferably provided to separate the elastomer lamination 6 and the elastomer core 5.

The sealing surface 4 is intended to receive a tubular conduit or duct 8 and form a sealing connection therewith. A cylindrical coupling 9 overlies the duct 8 and is provided with an inturned end flange 10 and an inturned retainer ring 11, which forms with the flange 10 a channel 12 dimensioned to receive and retain the planar wall 2, including the lamination 6.

The seal ring functions as follows:

When the seal ring is installed, as shown in FIG. 1, and subjected to protracted heat and pressure, the initially semitoroidal wall and the core therein tends to distort as shown in FIG. 2 so that the wall 3 assumes a more cylindrical shape and the sealing surface is increased, as indicated by 13 in FIG. 2. In effect, the juncture zone between the axially outer planar wall 2 and the semitoroidal wall 3 forms a circular hinge permitting angular turning of the semitoroidal portion 3. The fabric laminations while flexible, are quite strong and capable of being deformed, particularly at the region in which the wall 2 merges into the wall 3, as indicated by 14 in FIG. 2.

Figure 3:
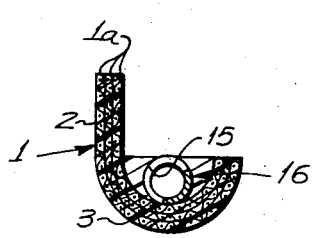
FIG. 3 is a sectional view, showing a modified form of the seal ring, similar to FIG. 1, but including a garter spring.

Reference is now directed to FIG. 3. The construction here shown is essentially the same as the first described structure, except that the elastomer core 5 is provided with a molded channel 15 which receives a garter spring 16, and, if desired, the elastomer lamination 6 may be omitted. In operation, the construction shown in FIG. 3 tends to take the form shown in FIG. 2. In this case, however, the region radially inward from the garter spring engages the conduit or duct with greater force than the margins axially thereof so that under adverse conditions the seal is improved.

Figure 4:
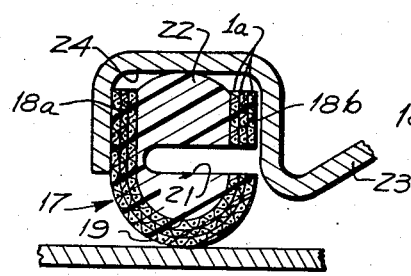
FIG. 4 is a sectional view, similar to FIG. 1, showing a further modified form of the seal ring, dimensioned to fit within the space normally occupied by an O-ring or the like, and showing fragmentarily, adjacent portions of a coupling and duct or conduit.

Reference is now directed to FIG. 4. The previously described structure involves a J-shaped configuration. In FIG. 4, the seal ring 17 is U-shaped in cross section, forming an axially outer planar wall 18a and an axially inner planar wall 18b, joined by a semitoroidal wall 19 corresponding to the wall 3. In this construction, an elastomer core 20, bonded to the elastomer impregnated in the fabric laminations fills the area defined by the walls 18a, 18b and 19, except for an axial channel 21 which extends from the axially inner wall 18b through the elastomer core or substantially so. The radially outer portion of the core 20 extends radially beyond the walls 18a and 18b, as indicated by 22.

Externally, the dimensions of the seal ring shown in FIG. 4 may approximate the dimensions of a conventional seal ring such as an O-ring or the type of seal ring disclosed in the aforementioned patent. Consequently, a conventional coupling 23, having a conventional seal ring channel 24, may receive the seal ring. It should be noted, of course, that the seal ring of J-configuration may also fit a conventional seal ring channel providing that the retainer ring 11 be fitted therein.

Figure 5:
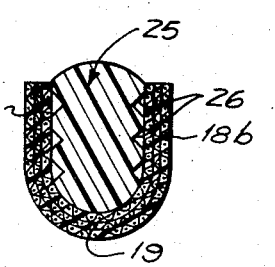
FIG. 5 is another sectional view, similar to the preceding views, showing a further modified construction, having a core which is not bonded to the walls of the seal ring.

Reference is now directed to FIG. 5. In the previous constructions the cores were bonded to the fabric laminations. In FIG. 5, the seal ring comprising the walls 18a, 18b and 19 receive an elastomer ring 25 which is not bonded thereto but essentially fills the space provided except for side grooves 26.

Figure 6:
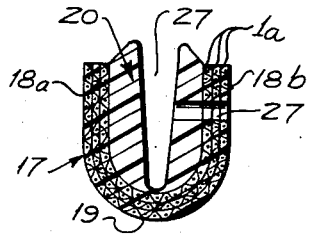
FIG. 6 is a similar sectional view of a still further modified form of the seal ring, in which a split core is provided.

Reference is now directed to FIG. 6. The construction here illustrated is closely related to the construction shown in FIG. 4; that is, the elastomer core 20 is split or divided by a radially inwardly directed channel 27, and the axially inner wall 18 is provided with ports 28 communicating with the channel 27.

Figure 7:
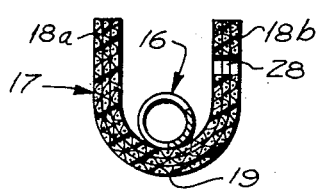
FIG. 7 is a sectional view of a U-shaped embodiment of the seal ring in which the elastomer is confined to the laminations and a constricting garter spring is contained in the seal ring.

Reference is now directed to FIG. 7. The seal ring 17 here illustrated also employs fabric laminations which are U-shaped in cross section. In this case, no core is employed, but instead, a garter spring 16 is utilized. In some cases, it is desirable to provide axial ports 28 in the axially inner wall 18b.

Figure 8:
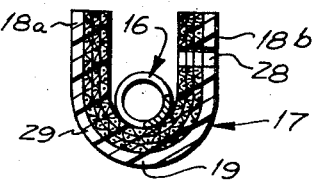
FIG. 8 is a sectional view of a modified form of the seal ring shown in FIG. 7, wherein an external coating of an elastomer is provided.

Reference is now directed to FIG. 8. This construction is essentially the same as that shown in FIG. 7 except that the fabric laminations are encased in an external elastomer coating or lamination 29. In this regard, it should be noted that if desired a similar external lamination of an elastomer may be provided on the previous embodiments.

Referring again to FIG. 7, tests have shown that although the same elastomer may impregnate the fabric as is used to form the core, such as the core 5, the seal ring is capable of functioning dependably at higher temperatures and for a longer time than the construction shown, for example, in FIGS. 1 and 2. This is due in part to the fact that the constricting force exerted by the spring is maintained substantially constant through a wider temperature range and for a longer period of time than the core 5. Also, it has been found that the garter spring 16 does not require constraint so that the core 5, as shown in FIG. 3, may be eliminated if the garter spring is used.

Figure 9:
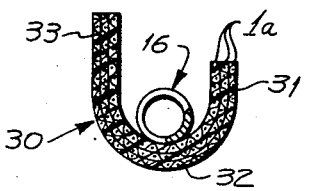
FIG. 9 is a sectional view of an embodiment, similar to FIG. 7, except that the seal ring is J-shaped in cross section.
Figure 10:
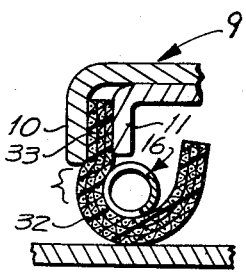
FIG. 10 is a sectional view of the embodiment shown in FIG. 7, showing the ring subject to pressure internally of the coupling.

Reference is now directed to FIGS. 9 and 10. The sealing ring 30 here shown is similar to FIG. 7 in that the elastomer, except for a nominal surface coating, is confined to the fabric laminations; however, the seal ring is J-shaped with a short inner wall 31, with the laminations continuing therefrom to form a semitoroidal connecting wall 32 and an outer wall 33, corresponding to the walls 3 and 2 of FIGS. 1, 2 and 3, and the walls 19 and 17 of FIGS. 4 through 8. A garter spring 16 is used to constrict the seal ring 30. The garter spring 16 not only serves to constrict the seal ring into sealing contact with the duct 8 or its equivalent, but also materially increases the resistance of the seal ring to extrusion between the duct 8 and the channel 12 of FIGS. 1 and 2, or the channel 24 of FIG. 4.

The short inner wall 31 eliminates the need of perforations 28 which are difficult to form and ensures access of pressure fluid to the exterior surface of the seal ring, when used in a conventional retaining channel 24, such as shown in FIG. 4.

Figure 11:
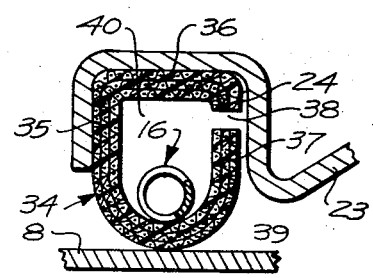
FIG. 11 is a sectional view, similar to FIG. 9, wherein the longer radial wall of the seal ring is provided with an integral cap band joined thereto by one margin, the opposite wall having a garter spring receiving slit.

Reference is now directed to FIG. 11 which illustrates a further embodiment of the seal ring, designated 34, intended for use in a conventional seal retaining channel, as distinguished from the construction shown in FIGS. 1 and 2. Substantial tests seem to have established the fact that the garter spring will not escape from the J-shaped construction shown in FIGS. 9 and 10, or that internal pressure will force the outer wall 2 or 17 from the retainer channel, even under conditions of excessive pressure. However, considering the possible dire result should failure occur, the safety factor may be further increased by continuing the laminations axially inwardly from the radially outer end of the axially outer wall 35 of the seal ring 34 to form an essentially cylindrical cap or cover 36. The axially inner extremity of the cover 36 confronts the axially inner wall 37 of the seal ring and defines therewith an annular slot 38. As in the other constructions, the walls 35 and 37 are joined by a semitoroidal portion 39.

The laminations are continuous from the radially outer end of the inner wall 37 to the extremity of the cover 36. In fact, the seal 34 may be formed by wrapping the impregnated laminations about a core, then cutting the slot 38. While this may be done with a single blade, it is preferred to use a double blade so that a space is formed to provide access to the annular cavity 40 formed when the core is removed.

The garter spring 16 is inserted through the slot 38. When the seal 34 is in use, the slot 38 ensures access to the cavity so that pressure fluid expands the seal against the confronting walls, the cover 36 sealing against the radially outer side of the seal retainer channel as well as further assuring retention of the spring 16.

The annular hinge zone 14 described in relation to FIG. 2 is present in all of the embodiments illustrated when the seal ring is subject to heat and internal pressure. The garter spring 16 in each case provides increased protection against extrusion of the seal ring past the wall 10 or the corresponding side of the channel 24 if the seal ring is subject to extreme loads.

It should be noted that while the various embodiments of the seal ring are intended to effect a seal with a radially inner surface, any of the embodiments may be arranged to engage a radially outer surface; that is, the semitoroidal portion may be directed radially outward as well as radially inward without changing the function of the seal ring.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A seal interposed between a conduit member and a surrounding coupling member, wherein one of the members includes a wall fixed thereto and extending radially therefrom into confronting relation with the other member, the wall separating the interior of the conduit from the region surrounding the conduit and the coupling, said seal comprising:
   a. multiple laminations of elastomer impregnated fabric defining a ring having a planar radially extending portion positionable in sealing engagement with the radially extending wall, and a continuing portion of semitoroidal form curving into and beyond sealing engagement with one of the members;
   b. the laminations of the radially extending portion and semitoroidal portion forming at their juncture a circular hinge portion to permit angular turning of the semitoroidal portion with respect to the radially extending portion and a partial flattening of the semitoroidal portion against the member engaged thereby in response to fluid pressure on the surface of the semitoroidal portion exposed thereto;
   c. and an elastic means within the semitoroidal portion and resisting, when the semitoroidal portion is subject to fluid pressure, extrusion movement of the semitoroidal portion through the space between the radially extending wall and the other member.

2. A seal ring, as defined in claim 1, wherein:
   a. the elastic means is a semitoroidal elastomer core contained in the space defined by the semitoroidal sealing wall, and bonded thereto.

3. A seal ring, as defined in claim 1, wherein:
   a. the elastic means is a spring contained in the semitoroidal wall.

4. A seal ring, as defined in claim 1, wherein:
   a. the elastic means includes a semitoroidal elastomer core contained in the semitoroidal sealing wall and bonded thereto and a garter spring embedded in the core.

5. A seal ring, as defined in claim 1, wherein:
   a. the elastomer impregnated fabric laminations further include a second annular planar wall continuing from the semitoroidal wall in essentially parallel relation to the first wall.

6. A seal ring, as defined in claim 5, wherein:
   a. the second wall is equal in radial dimension to the first wall and is perforated.

7. A seal ring, as defined in claim 5, wherein:
   a. the second wall is of lesser radial dimension that the first wall.

8. A seal ring, as defined in claim 5, wherein:
   a. the second wall is coextensive with the first wall;
   b. and the elastic means is an elastomer core filling the space defined by the semitoroidal wall and the space between the first and second walls, and is bonded thereto.

9. A seal ring, as defined in claim 5, wherein:
   a. the elastic means is a separable elastomer core disposed within the semitoroidal wall and between the first and second walls.

10. A seal ring, as defined in claim 5, wherein:
    a. the second wall is coextensive with the first wall;
    b. and the elastic means is an elastomer bonded to the first wall and second wall and provided with a central radial slit.

11. A seal ring, as defined in claim 5, wherein:
    a. the exterior surface of the laminations are provided with an elastomer coating.

12. A seal ring, as defined in claim 5, wherein:
    a. the second wall is of lesser radial dimension than the first wall;
    b. The elastomer impregnated fabric laminations continue axially from the radially outer extremity of the first wall and overlap the second wall defining therewith an annular slit;
    c. and the elastic means is a spring insertable through the annular slit.

13. A seal ring, comprising:
    a. multiple laminations of elastomeric impregnated fabric defining a ring of J-shaped cross section, including a semitoroidal portion adapted for sealing engagement with a confronting cylindrical surface, and a radial portion adapted for sealing engagement with a radially directed planar surface surrounding the cylindrical surface and spaced therefrom;
    b. and a circular spring received in the semitoroidal portion and resisting extrusion of the seal ring through the space between the cylindrical surface and the planar surface.

14. A seal ring, as defined in claim 13, wherein:
    a. the multiple laminations continue axially from the radial portion into confronting relation with the opposite side of the seal ring and define therewith an annular slit to permit pressurizing the interior of the seal ring and to permit insertion of the seal ring.

* * * * *